F. M. ELLIOTT.
TRAFFIC SIGNAL FOR MOTOR VEHICLES.
APPLICATION FILED DEC. 22, 1921.
1,415,817.
Patented May 9, 1922.
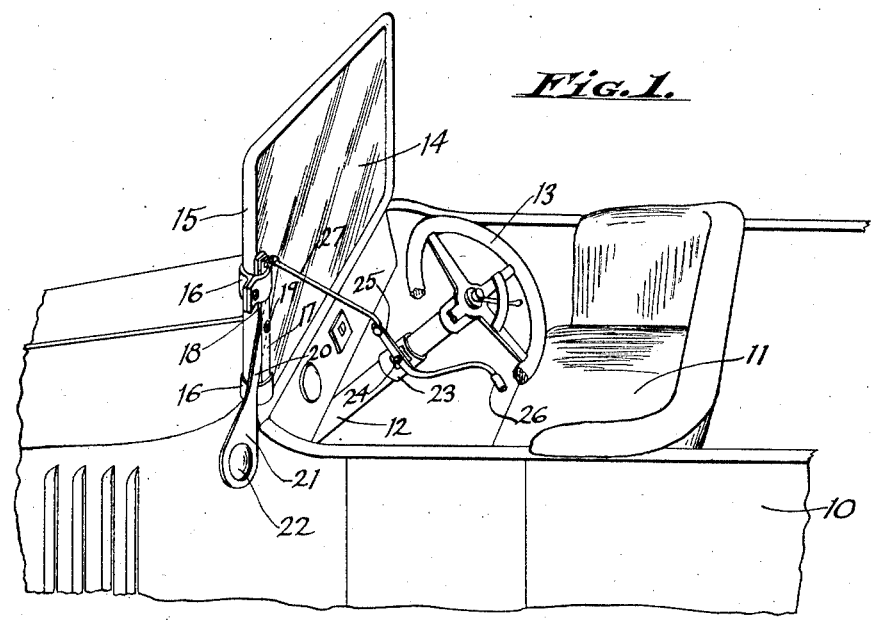
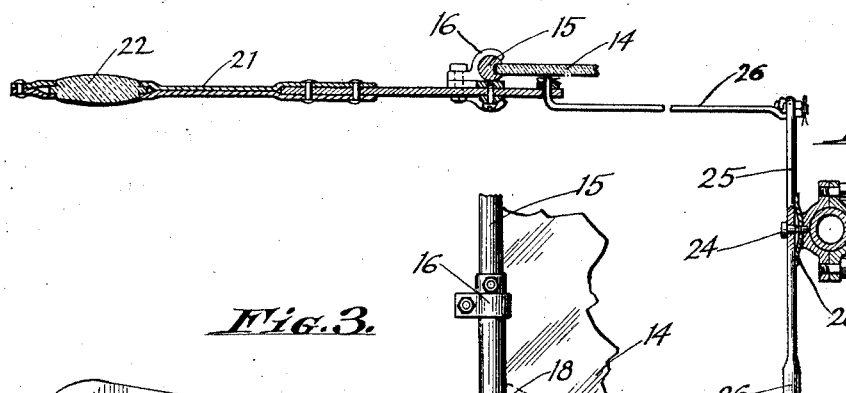
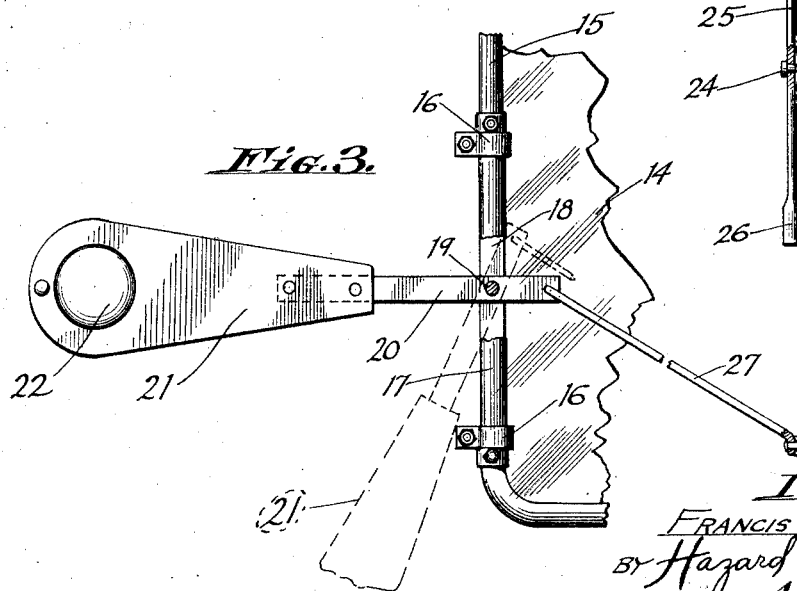
Inventor:
FRANCIS M. ELLIOTT
By Hazard & Miller
Attorneys

UNITED STATES PATENT OFFICE.

FRANCIS M. ELLIOTT, OF GARDENA, CALIFORNIA.

TRAFFIC SIGNAL FOR MOTOR VEHICLES.

1,415,817. Specification of Letters Patent. Patented May 9, 1922.

Application filed December 22, 1921. Serial No. 524,144.

*To all whom it may concern:*

Be it known that I, FRANCIS M. ELLIOTT, a citizen of the United States, residing at Gardena, in the county of Los Angeles and State of California, have invented new and useful Improvements in Traffic Signals for Motor Vehicles, of which the following is a specification.

My invention relates to a traffic or direction signal for motor vehicles, the principal object of my invention being to provide a relatively simple, practical and efficient device that is capable of being readily manipulated by the driver of the vehicle to which it is attached, for the purpose of notifying the drivers of other vehicles, pedestrians and traffic policemen of the movements of the vehicle to which the device is applied.

Further objects of my invention are to provide a vehicle direction indicator of the character referred to that comprises a minimum number of parts, thereby enabling the device to be manufactured and sold at comparatively low cost; to provide a signaling device that may be easily and quickly applied to or removed from a vehicle; and, further, to provide a signaling device that is capable of being used upon practically all makes of motor vehicles.

With the foregoing and other objects in view, my invention consists in the features of construction and combination and arrangement of parts hereinafter more particularly described and claimed, reference being had to the accompanying drawings, wherein:

Figure 1 is a perspective view of a portion of a motor vehicle showing a signaling device of my improved construction in position thereupon;

Figure 2 is a horizontal section taken approximately on line 2—2 of Figure 1, showing the signaling arm occupying a horizontal or signaling position;

Figure 3 is an elevational view of a portion of the windshield of a vehicle showing my improved signaling device in position thereupon.

Referring by numerals to the accompanying drawings, which illustrate a practical embodiment of my invention, 10 designates the body of a motor vehicle, 11 the front or driver's seat thereof, 12 the steering post or column, 13 the steering wheel, 14 the usual windshield, and 15 the vertically disposed member that forms one side of the windshield frame.

Detachably secured to the upright frame member 15 by suitable clamps 16 is a short vertically disposed bar 17 that is provided with a vertical slot 18, or said member 17 may be formed in two parts, the same being spaced a suitable distance apart to form the vertically disposed slot. Extending through the member 17 is a pin 19 upon which is pivotally mounted an arm 20 and connected in any suitable manner to the outer end thereof is an elongated plate 21 that performs the functions of a semaphore or signaling arm, and in order that this arm may be readily observed from a considerable distance a disk or bull's eye 22 of glass, preferably red, is seated in an opening that is formed in said arm adjacent to its outer end.

Clamped on the steering post or column 12 is a collar 23 in which is seated a horizontally disposed pin 24, and fulcrumed thereupon is the lower portion of a lever 25, the main body portion of which extends upwardly and rearwardly from said pin 24, and its upper end terminates in a handle 26 that normally occupies a position just below the left hand portion of the steering wheel 13. Pivotally connected to the lower forward end of the lever 25 is one end of a connecting rod 27, the opposite end thereof being pivotally connected to the upper end of arm 20. Interposed between the lever 25 and the clamping collar 23 and mounted upon the pivot pin 24 is a friction producing member 28, preferably a concavo-convex washer, which is designed to maintain the lever 25 in its shifted position, but said friction member does not interfere with the free actuation of the lever 25 when the upper end thereof is manually engaged and moved upwardly or downwardly.

Under normal conditions, or while not in signaling position, the arm 20 and plate 21 depend from the pivot pin 19, as illustrated by dotted lines in Figure 3, and when the driver of the vehicle desires to shift the signaling arm into position to indicate a stop or a turn, the handle 26 on the upper end of lever 25 is engaged and drawn upwardly, thereby swinging the rear end of said lever downwardly and, through rod 27, arm 20 and the plate 21 are shifted into a substantially horizontal position or into an inclined position relative to a horizontal plane, thereby indicating the intention of the driver to stop or turn the car to which the apparatus is applied. The friction disk 28 bearing on the lever 25 retains the same in its shifted position and, consequently, the signaling arm is maintained in its shifted position until the operator manually engages the upper end of the lever and actuates the same to return the parts to their normal or out-of-service position.

The colored glass disk or bull's eye carried by the outer portion of plate 21 renders the signaling device readily discernible at a considerable distance, and even at night the signaling arm is discernible to a certain extent, owing to the colored rays of light that pass through said disk or bull's eye.

A vehicle direction indicator of my improved construction is comparatively simple, may be easily and quickly applied to or removed from the vehicle, and is very effective in performing its intended functions.

It will be understood that minor changes in the size, form and construction of the various parts of my improved vehicle direction indicator may be made and substituted for those herein shown and described without departing from the spirit of my invention, the scope of which is set forth in the appended claims.

I claim as my invention:

1. The combination with a motor vehicle, its windshield and steering post, of a slotted support detachably connected to the windshield frame, a collar detachably applied to the steering post, a signaling arm pivotally mounted in said slotted support, an actuating lever fulcrumed on the support on the steering post, and an operating connection between said lever and the signaling arm.

2. The combination with a motor vehicle, its windshield and steering post, of a slotted support detachably connected to the windshield frame, a collar detachably applied to the steering post, a signaling arm pivotally mounted in said slotted support, an actuating lever fulcrumed on the collar on the steering post, an operating connection between said lever and the signaling arm, and a disk of colored transparent material arranged in the outer portion of said signaling arm.

3. The combination with a motor vehicle, its wind shield and steering post, of a slotted support detachably connected to the windshield frame, a collar detachably applied to the steering post, a signaling arm pivotally mounted in said slotted support, an actuating lever fulcrumed on the collar on the steering post, an operating connection between said lever and the signaling arm, and means between the fulcrumed lever and is support for frictionally engaging and maintaining said lever in its shifted position.

4. The combination with a motor vehicle, its windshield and steering post, of a slotted support detachably connected to the windshield frame, a collar detachably applied to the steering post, a signaling arm pivotally mounted in said slotted support, an actuating lever fulcrumed on the collar on the steering post, an operating connection between said lever and the signaling arm, a disk of colored transparent material arranged in the outer portion of said signaling arm, and means between the fulcrumed lever and its support for frictionally engaging and maintaining said lever in its shifted position.

5. A vehicle direction signal comprising a slotted support adapted to be adjustably secured to the side of a motor vehicle, a signaling arm fulcrumed to said support and passing through the slot therein, an operating leved adapted to be fulcrumed upon the steering post of the vehicle, and an operating connection between said lever and said signaling arm.

6. A vehicle direction signal comprising a slotted support adapted to be adjustably secured to the side of a motor vehicle, a signaling arm fulcrumed to said support and passing through the slot therein, an operating lever adapted to be fulcrumed upon the steering post of the vehicle, an operating connection between said lever and said signaling arm, and a section of colored transparent material carried by the outer portion of said signaling arm.

7. A vehicle direction signal comprising a slotted support adapted to be adjustably secured to the side of a motor vehicle, a signaling arm fulcrumed to said support and passing through the slot therein, an operating lever adapted to be fulcrumed upon the steering post of the vehicle, an operating connection between said lever and said signaling arm, and a friction producing member adapted to engage the operating lever to retain the same in its shifted position.

In testimony whereof I have signed my name to this specification.

F. M. ELLIOTT.